UNITED STATES PATENT OFFICE.

HOMER HOLLAND, OF WESTFIELD, MASSACHUSETTS.

IMPROVEMENT IN THE MODE OF TREATING METALLIFEROUS SULPHURETS.

Specification forming part of Letters Patent No. 26,590, dated December 27, 1859.

*To all whom it may concern:*

Be it known that I, HOMER HOLLAND, of Westfield, in the county of Hampden and State of Massachusetts, have invented a new and useful means of oxidizing the metalliferous sulphides by igniting them with native nitrate of lime or nitrate of lime and magnesia, of which the following is a specification.

The invention consists in the use of the oxygen of the nitric acid of certain specific bases which control the decompositions of the metallic sulphides in the ores to be treated.

My process is a substitute for the various roasting processes in reverberatory furnaces or on open hearths.

I use the native nitrate of lime, or nitrate of lime and magnesia together, as these salts occur occasionally in considerable abundance in certain caverns and other similar localities.

I am aware that the nitrate of lime is regarded as the equivalent of the nitrate of any other base; but that is true only in theory, or only so far as the acid is concerned. There are peculiarities in each base that takes the salt formed by the union of the acid and base, which remove this product quite out of the range of equivalency when we look to the process of treatment necessary to work them with, whether by treating them by heat or solvent liquids. The terms "equivalent" and "substitute" have in practical and theoretical chemistry a technical bearing so interspersed with exceptions that no practical chemist who has used the nitrate of soda, for example, in decomposing metalliferous sulphides can pronounce beforehand the result of substituting nitrite of lime in the decomposition for the nitrate of soda. The results are always liable to variations from adventitious causes, as cohesion, quantity of matter, gravity, greater or less solubility by the increase of heat, and a great many causes found out by experience.

Experience, then, is knowledge, and often discovery. In the present case I have ascertained the use of nitrates of lime and of magnesia in treating the metallic sulphides to possess considerable advantages.

To enable others skilled in metallurgy to use my invention, I will proceed to describe the method I have devised to carry it into operation.

I take any auriferous sulphide, as free as possible from foreign matters, reduce it to a fine powder by the stamping-mill or by any other convenient method, and for every one hundred pounds of the ore I add twenty-five to thirty-three pounds of the crude nitrate of lime, or nitrate of magnesia and lime, as these salts occur together in certain locations, as in caverns and other similar situations. The mixture of materials being thoroughly ground together is placed in iron pans or other suitable vessels closed from air and heated to redness so long as acid vapors continue to be emitted from the ignited mass. The vapors are conducted away to the usual sulphuric-acid chambers, as referred to in my process described for generating sulphuric acid from metalliferous sulphides. The ignition should not be intense nor long continued. As soon as the vapors cease to come over the mass is allowed to cool, and is withdrawn and lixiviated with water, and the *caput mortuum* amalgamated, or melted in a furnace, or otherwise treated for separating its valuable constituents, according to their several proportions, as indicated in my patent of 29th May, 1855.

What I claim in the present application, and desire to secure by Letters Patent, is—

The treatment of metalliferous sulphides with the native nitrate of lime, or nitrate of lime and magnesia, in iron vessels, in the manner and for the purpose substantially as herein set forth.

HOMER HOLLAND.

Witnesses:
L. R. NORTON,
I. H. TURNER.